United States Patent [19]

Bygdnes

[11] Patent Number: 4,562,500

[45] Date of Patent: Dec. 31, 1985

[54] MECHANISM FOR LATCHING MAGNETIC DISK MEMORY HEAD/ARM ASSEMBLY IN PARKING ZONE

[75] Inventor: Perry A. Bygdnes, Redwood City, Calif.

[73] Assignee: Tandon Corporation, Chatsworth, Calif.

[21] Appl. No.: 497,873

[22] Filed: May 25, 1983

[51] Int. Cl.$^4$ .......................... G11B 5/54; G11B 17/00
[52] U.S. Cl. ...................................... 360/105; 360/86; 360/98
[58] Field of Search .................................... 360/97–99, 360/86, 137, 104–106, 109, 103; 369/244, 257, 268, 235, 215, 222

[56] References Cited

U.S. PATENT DOCUMENTS

| | | | |
|---|---|---|---|
| 3,518,651 | 6/1970 | Keeney | 360/75 |
| 4,139,874 | 2/1979 | Shiraishi | 360/105 |
| 4,164,769 | 8/1979 | Kaseta et al. | 360/106 |
| 4,188,648 | 2/1980 | Guerini | 360/105 |
| 4,331,989 | 5/1982 | Viskochil | 360/97 |
| 4,484,241 | 11/1984 | Brende et al. | 360/105 |

*Primary Examiner*—Stuart N. Hecker
*Assistant Examiner*—David J. Severin
*Attorney, Agent, or Firm*—Fraser and Bogucki

[57] ABSTRACT

A mechanism is disclosed for latching the read/write heads of a magnetic disk memory in a parking zone. The mechanism permits the heads to operate in the read/write mode within small distances of the parking zone and requires no additional electrical power. The mechanism includes a spring pawl cantilevered from the head/arm assembly and a latch plate pivotally mounted on the disk memory housing. In the latched condition of the head/arm assembly, the tip of the pawl engages a small abutment surface on the latch plate which is spring biased to arrest the motion of the assembly. Unlatching is effected by actuating the head/arm assembly to overcome the bias of the latch plate spring.

3 Claims, 7 Drawing Figures

MECHANISM FOR LATCHING MAGNETIC DISK MEMORY HEAD/ARM ASSEMBLY IN PARKING ZONE

FIELD OF THE INVENTION

This invention reltes generally to magnetic disk memories and more particularly to a mechanism for releasably latching the head/arm assembly of such memories when the heads are in the landing or parking zone.

BACKGROUND OF THE INVENTION

In high performance magnetic disk memories of the "Winchester" type, the read/write heads are maintained out of contact with their respective disk surfaces, the air flow induced by the rapidly rotating disks being sufficient to support the heads which, in effect, are flown at a small distance from the disk surfaces. To prevent damage to the data storage portions of the disk surfaces as a result of head contact, a part of each disk is dedicated as a parking or landing zone within which the heads may be safely brought into contact with the disk surfaces. The parking zone, or track, is typically located radially inward of the data tracks and it is common practice to latch the head/arm assembly in the parking position to protect the disk surfaces and the integrity of the recorded data during handling and shipping of the disk memory.

Various head latching techniques are in use. In accordance with one type, the heads are held in the parking zone by a permanent magnet. Because of the range of the magnetic field, however, the heads, when operating in the read/write mode, cannot be brought too close to the parking zone where their motion can be influenced by the latch magnet field. This constraint places a limit on the number of data tracks.

Another head latching arrangement utilizes a solenoid-operated mechanism in which the solenoid is energized to unlatch the heads. Although failsafe, this approach requires additional power constantly applied to the solenoid during the normal operation of the disk memory.

SUMMARY OF THE INVENTION

The present invention provides a mechanism for latching the read/write heads in the parking or landing zone that requires no additional electrical power and permits the heads to operate in the read/write mode at small distances from the parking zone.

In accordance with one embodiment of the invention, the pivoted head/arm assembly of a magnetic disk memory carries a rearwardly projecting latching pawl in the form of a leaf spring cantilevered from the lowermost head arm. The pawl cooperates with a latch plate pivotally mounted on the base of the disk memory chassis.

One end of the latch plate is biased against a stop by an extension spring while the other end of the latch arm has a step defining a small abutment surface which, when engaged by the tip of the pawl, latches the head/arm assembly. Unlatching is achieved by energizing the head/arm assembly actuator which applies sufficient torque to retract the assembly and pivot the latch arm against the bias of the extension spring. Only a minute displacement of the head/arm assembly is required before the tip of the pawl clears the small abutment surface on the latch plate to release the head/arm assembly. The latch plate step has a corner, remote from the abutment surface, which, during the unlatching sequence, engages and deflects the spring pawl to accelerate the disengagement of the pawl tip from the abutment surface. To relatch the heads, the head/arm assembly is driven toward the parking zone. At a small distance therefrom, the pawl engages the stepped end of the latch plate and is initially deflected thereby. During the final travel of the head/arm assembly, the flexed pawl snaps into the step just as the head/arm assembly contacts its inner limit stop thereby arresting the motion of the assembly. Only a light force is required to latch the head/arm assembly in comparison to that required for unlatching. For example, the unlatching force may be 20 to 25 times greater than the force necessary to effect latching.

The geometry of the latching mechanism of the present invention can be easily controlled to allow the head/arm assembly to operate in the read/write mode within extremely small distances from the parking zone to maximize the area of the disk surface dedicated to data storage. Moreover, no additional power is required to operate the latching mechanism beyond that normally utilized to actuate the head/arm assembly.

BRIEF DESCRIPTION OF THE DRAWINGS

A better understanding of the present invention may be had from the detailed description below read in conjunction with the accompanying drawings in which.

DETAILED DESCRIPTION

Figure 1:
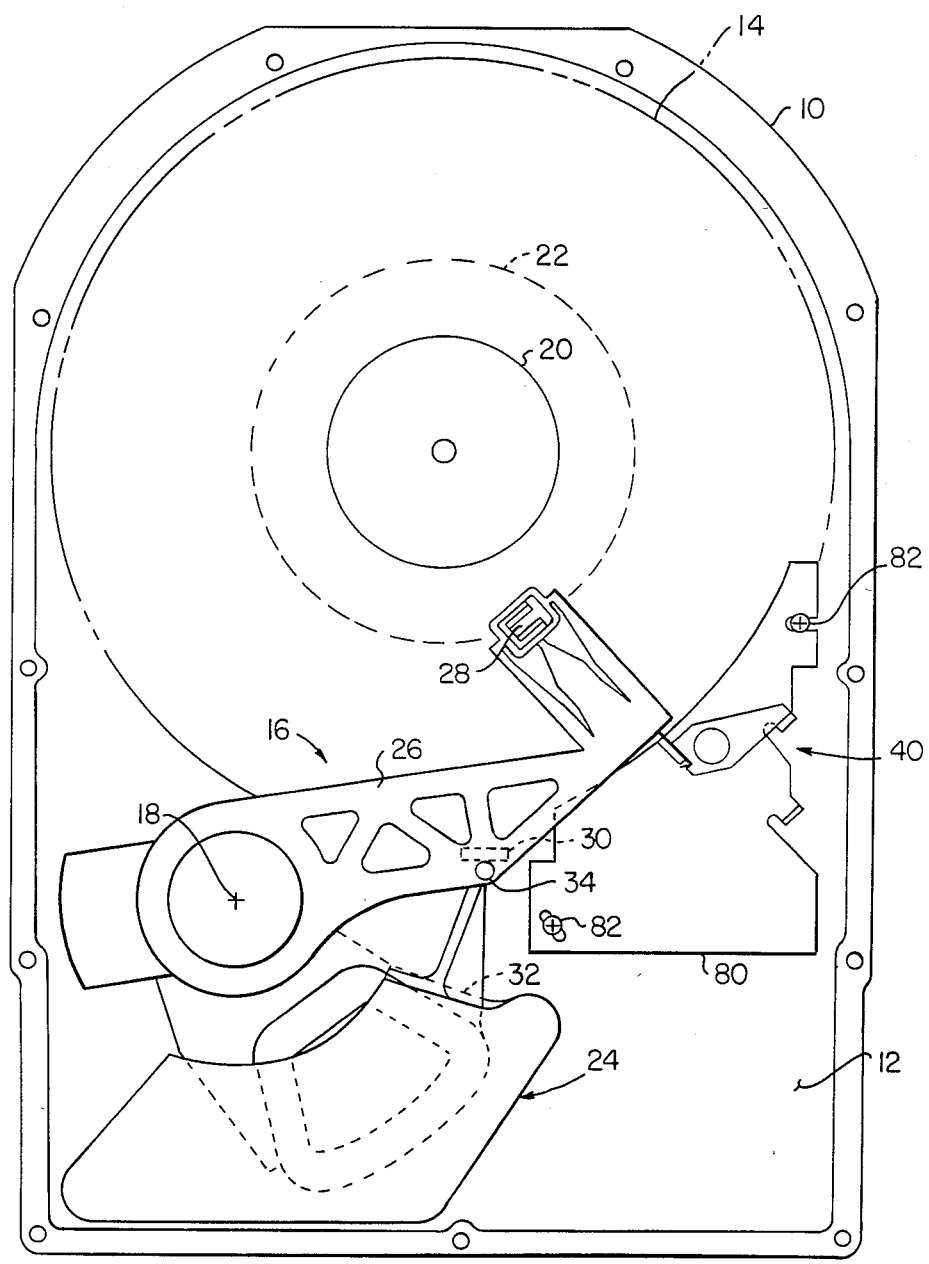
FIG. 1 is a somewhat schematic, top plan view of a magnetic disk memory with the cover removed and showing the head/arm assembly latched in the parking position by a releasable latching mechanism according to the present invention.

Turning first to FIG. 1, there is shown, somewhat schematically, a magnetic disk memory including, generally, an integrally cast housing 10 having an internal mounting surface or base 12. The housing encloses a plurality of magnetic disks 14 and an associated head/-arm assembly 16 mounted to pivot on the base plate 12 about an axis 18. The disks are carried by a spindle 20 driven by a motor 22 beneath the housing base, while the head/arm assembly is actuated relative to the disks by a moving coil motor 24. As is well known in the art, the housing 10 is sealed by a cover (not shown, for clarity) to define a contamination-free enclosure or "clean chamber".

The head/arm assembly 16 includes a series of stacked arms 26 carrying identical flying head structures 28 pairs of which cooperate with the opposite faces of the magnetic disks in a manner well known in the art. See, for example, U.S. Pat. application Ser. No. 308,277, filed Oct. 5, 1981 and assigned to the present assignee.

The travel of the head/arm assembly 16 is limited by inner and outer stops 30 and 32, respectively, mounted on the base 12. The stops are positioned to be engaged by a post 34 projecting from the undersurface of the lowermost head arm 26. In FIG. 1, the head/arm assembly is shown at its inner limit with the post 34 against the stop 30. In this position of the head/arm assembly, the heads 28 are in their respective parking zones. The head/arm assembly is held in that position by a latch mechanism 40 which is the subject of the present invention.

Figure 2:
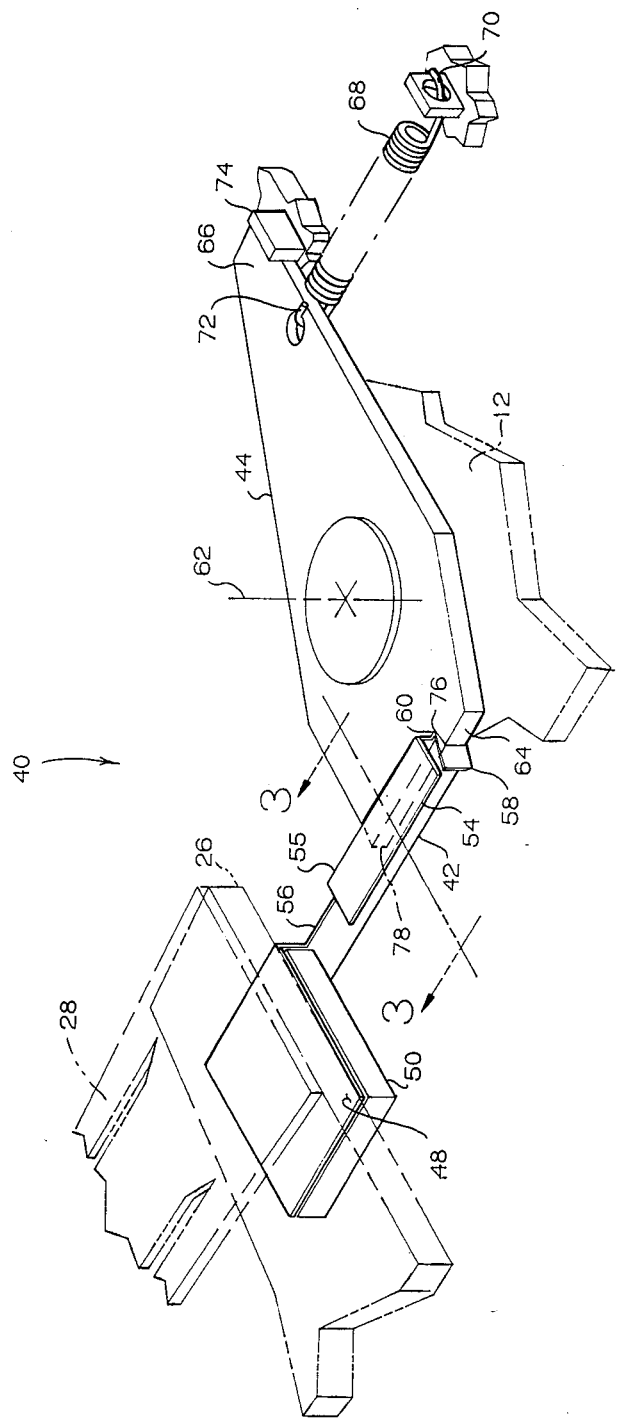
FIG. 2 is an enlarged, perspective view of the latching mechanism shown in FIG. 1.
Figure 3:
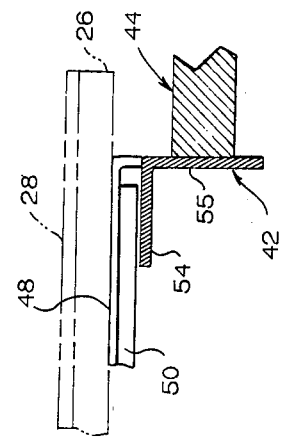
FIG. 3 is a cross-section view of a portion of the latching mechanism as seen along a vertical plane defined by the line 3—3 in FIG. 2.

With reference now also to FIGS. 2 and 3, the latch mechanism 40 includes, generally, a spring pawl 42 and a latch plate 44. The pawl 42 is basically a leaf spring cantilevered from the undersurface of the lowermost head arm and projecting rearwardly therefrom. The fixed end of the spring pawl has a horizontal projection 48 secured to the lower head arm 26 by an attachment plate 50 while the free end of the pawl includes a horizontal flange 54 forming a stiffened, L-shaped section 55. Between the stiffened section 55 and the fixed end 48 is a vertical flex section 56 allowing the pawl to be deflected through a small horizontal arc. A tab 58 at the outer extremity of the pawl is folded back towards the flange 54 at an acute angle to define a vertical edge or tip 60.

The latch plate 44 is mounted on the base 12 to pivot about the axis 62. The latch plate has inner and outer ends 64 and 66, respectively. An extension spring 68 having one end 70 fixed to the base 12 and its other end 72 attached to the latch plate urges the outer end of the plate into engagement with a stop 74. The inner end 64 of the latch plate is provided with a step defining a small abutment surface 76 adapted to be engaged by the tip 60 of the pawl. The step also defines a corner 78 on the latch plate which corner is located a predetermined distance from the abutment 76 and is positioned to engage the stiffened section 55 during unlatching.

The latch plate 44 may be mounted directly on the base 12. Preferably, however, as shown in FIG. 1, the plate 44 and extension spring 68 are attached to the electronics access cover 80 which, in turn, is secured to the base 12 by screws 82 passing through slotted openings in the cover 80. Final adjustment of the position of the latch plate relative to the pawl 42 is thereby facilitated.

The sequence of operation of the latch mechanism from the latched state to the unlatched state is shown in FIGS. 4-7.

Figure 4:
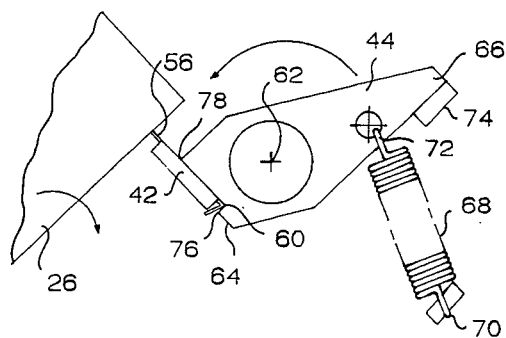
FIGS. 4–7 are plan views of the latching mechanism showing the unlatched sequence thereof.
Figure 5:
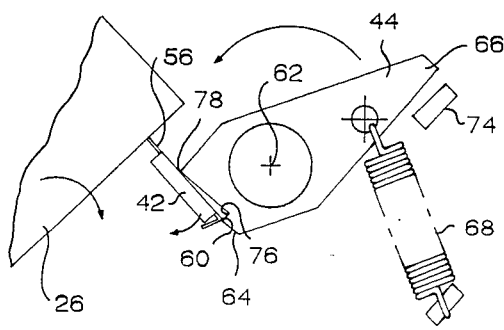
Figure 6:
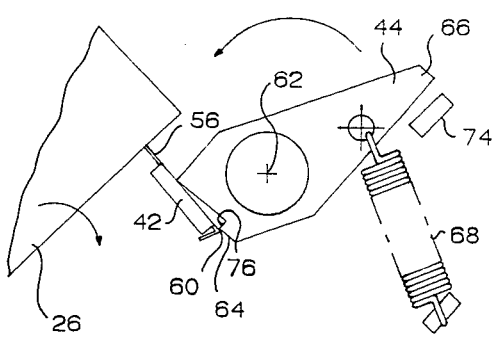
Figure 7:
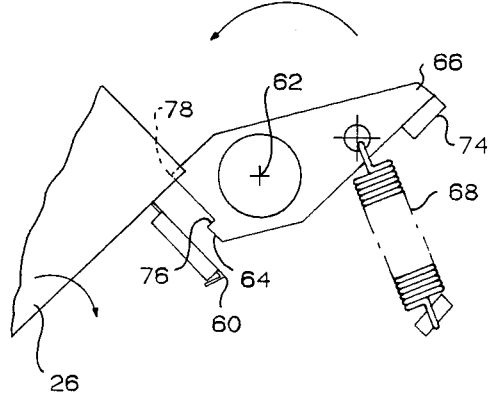

In the latched condition, FIG. 4, the stiffened section 55 of the spring pawl is seated within the step on the latch plate 44. Motion of the head/arm assembly is arrested by the inner limit stop 30 (see FIG. 1) and the latch plate abutment surface 76 against which the tip 60 of the pawl bears. To unlatch the head/arm assembly, the moving coil motor 24 is energized to retract the assembly, that is, to rotate it clockwise about the pivot 18 as shown by the arrows in FIGS. 4-7. Initially, this action causes the latch plate to rotate counterclockwise away from its stop (FIGS. 4-5) as a result of the force applied by the pawl to the abutment surface 76 which force is sufficient to overcome the bias imposed by the extension spring 68. Simultaneously, rotation of the latch plate causes the corner 78 to bear against the stiffened section of the pawl thereby deflecting it clockwise about the flex section 56 and expediting the release of the pawl tip 60 from the abutment surface 76, as shown in FIG. 6. When the pawl clears the latch plate, the plate is urged back against the stop 74 by the extension spring (FIG. 7).

To latch the head/arm assembly, the assembly is driven toward the parking zone. At a small distance therefrom, the pawl engages the inner end 64 of the latch plate and is deflected thereby. During the final travel of the head/arm assembly, the flexed pawl snaps into the step just as the assembly contacts the inner limit stop 30. In the latching sequence, the latch arm, of course, does not pivot.

The described configurations of the latch plate and spring pawl permit the heads to be operated in the read/write mode very close to the parking zone thereby maximizing the disk surface area available for data storage. In one practical example of the invention, the heads can be operated within about 0.015-0.20 inch (0.381-0.508 mm) of the parking zone. Moreover, it will be appreciated that the particular geometry of the components—for example, the depth and length of the latch plate step and the lengths of the latch plate moment arms—as well as the spring constants of the extension spring and pawl are determinative of the specific magnitudes of the forces required to latch and unlatch the head/arm assembly. Generally, the force required to unlatch the assembly greatly exceeds that needed for latching; for example, the ratio of those forces may be of the order of 20 or 25 to 1.

What is claimed is:

1. A magnetic disk memory comprising:
   a housing enclosing a plurality of spaced magnetic disks mounted on a spindle for rotation about the axis thereof, the housing having a base, the faces of the magnetic disks including data storage portions and a parking zone;
   a head/arm assembly pivotally mounted on the base, the assembly including a plurality of arms carrying read/write heads operatively associated with the faces of the disks, a stop on the base being adapted to be engaged by the assembly when the heads are in the parking zone;
   an actuator coupled to pivot the head/arm assembly to position the heads generally radially relative to the faces of the disks; and
   a mechanism for latching the head/arm assembly in a parking zone position, the latching mechanism including:
      a spring pawl projecting from the head/arm assembly in cantilever fashion, the spring pawl having an outer tip;
      a latch plate pivotally mounted on the housing base, the plate having a first end and a second end opposite the first, the first end defining a step for receiving the spring pawl when the head/arm assembly is latched in the parking zone, the step including a small abutment surface adapted to be engaged by the tip of the spring pawl; and
      a second stop projecting from the base, the second end of the latch plate being resiliently biased into engagement with the second stop and resisting movement of the head/arm assembly toward the unlatched position, unlatching of the head/arm assembly being effected by energizing the actuator to move the assembly away from the latched position, the pawl thereby pivoting the latch plate against the resilient bias, disengaging the pawl tip from the abutment surface.

2. A magnetic disk memory, as defined in claim 1, in which:
   the cantilevered spring pawl has a fixed end and a free end, the free end including a stiffened section and a flex section intermediate the stiffened section and the fixed end, the latch plate step defining a corner located a predetermined distance from the abutment surface, the corner being adapted to engage the stiffened section of the spring pawl to deflect the pawl when the latch plate pivots during the unlatching operation to expedite the disengagement of the pawl tip from the abutment surface.

3. A magnetic disk memory, as defined in claim 2, in which:
   the force required to unlatch the head/arm assembly is substantially greater than that needed to latch the assembly.

* * * * *